(12) United States Patent
Höf et al.

(10) Patent No.: US 8,406,121 B2
(45) Date of Patent: Mar. 26, 2013

(54) METHOD FOR ERROR DETECTION IN A PACKET-BASED MESSAGE DISTRIBUTION SYSTEM

(75) Inventors: Jonas Höf, München (DE); Norbert Löbig, Darmstadt (DE); Jürgen Tegeler, Penzberg (DE); Michael Tinnacher, Köflach (AT); Dieter Wallner, Graz (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1084 days.

(21) Appl. No.: 11/665,866

(22) PCT Filed: Sep. 19, 2005

(86) PCT No.: PCT/EP2005/054649
§ 371 (c)(1),
(2), (4) Date: Apr. 19, 2007

(87) PCT Pub. No.: WO2006/042776
PCT Pub. Date: Apr. 27, 2006

(65) Prior Publication Data
US 2007/0263547 A1 Nov. 15, 2007

(30) Foreign Application Priority Data
Oct. 20, 2004 (DE) .......................... 10 2004 051 167

(51) Int. Cl.
*G08C 15/00* (2006.01)
*H04L 12/56* (2006.01)
*H04L 12/28* (2006.01)

(52) U.S. Cl. ........ 370/217; 370/228; 370/241; 370/252; 370/408

(58) Field of Classification Search .......... 370/216–228; 455/423, 424, 433, 445, 446; 709/219, 223, 709/224, 239
See application file for complete search history.

(56) References Cited

U.S. PATENT DOCUMENTS 5,379,278 A * 1/1995 Safadi ........................... 370/221
(Continued)

FOREIGN PATENT DOCUMENTS

DE 199 28 484 A1 12/2000
DE 101 42 372 A1 7/2002
(Continued)

*Primary Examiner* — Kevin C Harper
*Assistant Examiner* — Samina Choudhry
(74) *Attorney, Agent, or Firm* — Laurence A. Greenberg; Werner H. Stemer; Ralph E. Locher

(57) ABSTRACT

In one aspect, a method for error detection in a packet-based message distribution system, according to which messages are distributed via a plurality of nodes and other system components, and each node comprises at least two addressable interfaces is provided. For the security of the system, the message distribution paths are designed in a redundant manner and redundancy paths are available in the message distribution system in the event of the breakdown of connections in the message distribution system. The invention topology of the message distribution system is known by the nodes, and the nodes check the accessibility of the other nodes by means of communication tests; interrogate intermediate system components by means of existing interfaces and in terms of the connection status thereof in relation to other nodes and/or system components, and signal optional error configurations, physical errors, and/or missing redundancy paths of the message distribution system.

25 Claims, 1 Drawing Sheet

U.S. PATENT DOCUMENTS

| | | | | |
|---|---|---|---|---|
| 6,208,856 | B1 * | 3/2001 | Jonsson | 455/424 |
| 6,393,478 | B1 * | 5/2002 | Bahlmann | 709/224 |
| 6,430,150 | B1 * | 8/2002 | Azuma et al. | 370/218 |
| 6,581,166 | B1 * | 6/2003 | Hirst et al. | 714/4 |
| 6,625,728 | B1 * | 9/2003 | Ahrens et al. | 713/2 |
| 6,662,217 | B1 * | 12/2003 | Godfrey et al. | 709/219 |
| 6,901,443 | B1 * | 5/2005 | Huang et al. | 709/224 |
| 7,385,931 | B2 * | 6/2008 | Magnaghi et al. | 370/248 |
| 7,844,439 | B2 * | 11/2010 | Nasle et al. | 703/18 |
| 2002/0133756 | A1 | 9/2002 | Jain | |
| 2003/0179742 | A1 | 9/2003 | Ogier et al. | |
| 2004/0022543 | A1 * | 2/2004 | Hosking et al. | 398/135 |
| 2004/0081087 | A1 | 4/2004 | Shea | |

FOREIGN PATENT DOCUMENTS

| | | |
|---|---|---|
| WO | WO 01/63850 A1 | 8/2001 |
| WO | WO-01/63850 A1 | 8/2001 |
| WO | WO-2004/010625 A2 | 1/2004 |

\* cited by examiner

METHOD FOR ERROR DETECTION IN A PACKET-BASED MESSAGE DISTRIBUTION SYSTEM

CROSS REFERENCE TO RELATED APPLICATIONS

This application is the US National Stage of International Application No. PCT/EP2005/054649, filed Sep. 19, 2005 and claims the benefit thereof. The International Application claims the benefits of German application No. 102004051167.5 DE filed Oct. 20, 2004, both of the applications are incorporated by reference herein in their entirety.

FIELD OF INVENTION

The invention relates to a method for error detection in a packet-based message distribution system, in which messages are distributed via a plurality of nodes and other system components, and each node has at least two addressable interfaces, and for the security of the system the message distribution paths are designed with redundancy, and redundancy paths are available in the event of the failure of one or more links between nodes and/or system components in the message distribution system.

BACKGROUND OF INVENTION

The correct functioning of communication facilities which are designed with redundancy, for example an IP-based message distribution system, also depends on correct wiring, for example the wiring between switches and communication nodes. Undetected errors in a message distribution system which is designed with redundancy to give high availability can, with a hardware failure, lead to the loss of stable calls, operational restrictions and cases of unreachability in a communication system. Miswiring and/or faulty configuration of the components in the case of new construction work or extensions to the communication system can lead to a loss of the setting data. Now it can happen that the services offered function smoothly before a system component failure occurs, in spite of incorrect wiring or a physical fault in a cable, because of the system redundancy. The effect of the incorrect wiring or the physical fault in the cable would then only have any effect when the first communication path between two points fails, in that it is then impossible to switch to a redundant path. That is to say, the result of such a wiring fault is that, for at least one link, there is in reality no path redundancy although the redundancy system concept intended there to be one. The missing redundancy has until now not been automatically recognized. Thus the result of wiring faults can be that a system fails to achieve in practical operation its specified security against failure, which it would in the ideal situation actually achieve. They thus represent a substantial risk to the reliability of communication facilities.

SUMMARY OF INVENTION

With currently known message distribution systems designed with redundancy, one has been reliant on conscientious work during the construction of the system and no (wiring) faults being incorporated. Any misconfigurations, a physical (wiring) fault or missing redundancy paths would first manifest themselves when a fault occurred in a system component, in that the intended system redundancy would then not exist. This uncertain state or uncertainty factor respectively is not particularly satisfactory from the point of view of the reliability of the system.

It is therefore an object of the invention to present a method of error detection in a packet-based message distribution system which recognizes any misconfigurations or physical faults, for example wiring faults or the absence of redundancy capability in the message distribution system, even before the incidence of a system component failure.

This object is achieved by the independent claims. Advantageous developments of the invention are the subject of the dependent claims.

The inventors have recognized that it is convenient if the nodes which are present in the message distribution system, preferably computers, know the logical design of the intended topological structure of the message distribution system, into which they are to be incorporated. This design should be administrable, i.e. capable of amendment by a system monitor, so that the topology can be modified during ongoing operation of the node. Using communication tests, between each other and with the neighboring system components, the nodes can determine the network addresses of the neighboring nodes and system components. Furthermore, they have the possibility of addressing and interrogating intermediate network elements which serve only to forward messages. These items of data are enough in themselves to verify the logical design of the topology. If the monitoring nodes are also permitted to disconnect individual ports on the intermediate network elements, it is possible in this way to initiate in addition routine tests for checking the redundancy properties of the system.

Faults in the wiring or a redundancy capability which, compared to the topological image, is not present in the controlling node, can be recognized and, optionally, alarm reports issued. In this way, the staff operating the message distribution system can be made aware of missing redundancy and/or a physical fault, before this is recognized solely because there is a connection failure for a system component.

Accordingly, the inventors propose that the familiar methods for fault detection in a packet-based message distribution system, in which messages are distributed via a plurality of nodes and other system components, and each node has at least two addressable interfaces, and in which for system security the message distribution paths are designed redundantly and in the event of a failure of one or more connections of the nodes and/or system components in the message distribution system there are redundancy paths, are improved in such a way that the topology of the message distribution system is known to the nodes and the nodes verify the accessibility of the other nodes by communication tests, and interrogate intermediate system components via available interfaces about their connection state with other nodes and/or system components, and signal reports of any misconfigurations, physical faults and/or redundancy paths which may be missing from the message distribution system.

By this means, physical faults such as wiring faults, which lead to a loss of path redundancy, are very quickly recognized and can generally be remedied before they lead to a connection failure. In the normal situation a repair would thus be effected as early as the commissioning of a system, before it went into normal operation. As a result, the scenario described above should never arise in ongoing operation. But even configuration errors can be recognized in this way, and rapidly cleared because the system is able to be administered.

Thus, with the new method the communication path between two ATM-based nodes can be checked during operation. If the result of the checks is negative, the through-switching data can be interrogated at upstream facilities in the message distribution system. Interfaces can be disconnected and connected for testing purposes, and control buffer data can be incorporated again by way of correction. Under the method according to the invention all this is possible using the topology data, available in the nodes which communicate via the message distribution system.

With the monitoring method described, it is possible practically to exclude any destabilization of the system due to wiring faults. This increases the reliability of systems in a real application, because the gap between the theoretically achievable availability and the availability actually achieved on site is closed. A risk, which is hard to estimate, is eliminated by the invention. A further advantage of the new method is that it can be carried out without the implementation of additional new hardware, using the hardware already present in the message distribution system.

The method is also suitable, for example, for IP-based message distribution systems, preferably in the case of a LAN or a VLAN, in which at least two unique network addresses, preferably IP or MAC addresses, are assigned to each node.

It is convenient if changes to the data which describes the topology are made via an operating interface. The topology of the message distribution system can then easily be changed.

One possible variant of the method makes provision for misconfigurations which are present in the message distribution system to be corrected automatically after they have been detected. For example, in the new method as an alternative to rewiring if one or more nodes and/or system components has a physical wiring error, the configuration data for the message distribution system can be modified manually. By this means, it is for example possible to make available an equivalent cross-link functionality, i.e. a communication path between upstream devices, for example switches.

The connection states of the nodes and/or system components are generally stored in connection tables ("bridge tables"). In the method, it is then convenient if the nodes flag up the situation if they cannot find their network addresses, or find them replicated, in the bridge tables of neighboring system components. If the network addresses of a node are completely missing or are replicated in the bridge tables of neighboring system components, then a redundancy path cannot be connected up.

If required, preferably during maintenance, restructuring and extension work activities, the functions for signaling and changing misconfigurations can be disabled. In this way, unwanted alarms from the system during maintenance work will be suppressed.

In addition to this, individual nodes and/or intermediate system components can, if required, be disconnected. This option is provided for the purpose of verifying the desired topology and the accompanying circuit switching and configuration. If the faults are only due to the configuration data, these can be autonomously rectified.

In a particular embodiment of the method, it is possible to execute on the nodes applications which check the bridge tables of the neighboring system components, and the network addresses actually present in them. These applications can be executed independently of the applications of the message distribution system, so as to disrupt the operation of the message distribution system as little as possible.

It is of advantage if, as part of the method, the communication tests and/or the nodal applications are disconnected during ongoing operations of the message distribution system, and are reconnected when required, in order for example to suppress unwanted alarms from the system during maintenance work.

This offers great advantages, for example, during repair work on the system or the restructuring of a local area network (LAN) topology. Before such activities start, the monitoring communication test described above should be disabled, in order to suppress alarms about inconsistencies during the restructuring. For example, when the topology of a LAN is being restructured it is necessary not only to change the physical structure but the new system structure must also be administered and appropriately modified on the nodes. As soon as the node's check is reactivated, the node will immediately check the consistency between the physical topology and the logical structure which it has.

In the new method, it is to be possible to disconnect individual nodes, neighboring nodes and/or system components as required. By this means it is possible to check the routine tests, of the redundancy characteristics of the system's redundancy paths, contained in these nodes and/or system components.

As an option, the disconnected nodes and/or system components can then be released for traffic again only when the consistency check has been successful. In this way one would have absolutely no restrictions in the ongoing operations from any wiring problem which arises.

The communication tests can be carried out during the system startup for the message distribution system, and routinely with the assistance of system components upstream from the control interfaces. By this means, the operation of the message distribution system will be impaired as little as possible by communication tests which are active.

The invention is described in more detail below by reference to the preferred exemplary embodiments, with the help of the figures, it being noted that these show only the essential elements which are directly required for an understanding of the invention. In these, the following reference marks are used: 1: first switch; 2: second switch; 3: first node; 3.1: link from first node to the first switch; 3.2: link from first node to the second switch; 4: second node; 4.1: link from second node to the first switch; 4.12: incorrect wiring/incorrect link for the second node; 4.2: link from second node to the second switch; 5: third node; 5.1: link from third node to the first switch; 5.2: link from third node to the second switch; 6: fourth node; 6.1: link from fourth node to the first switch; 6.2: link from fourth node to the second switch; 7: first application; 8: second application; 9 third application; 10: fourth application; 11: duplicated cross-link between the first and second switches; 12: first router; 13: second router.

Elsewhere, the following abbreviations are used:
ATM=asynchronous transfer mode
IP=Internet protocol
LAN=local area network
MAC=message authentication code
VLAN=very local area network

BRIEF DESCRIPTION OF THE DRAWINGS

The individual drawings show.

DETAILED DESCRIPTION OF INVENTION

Figure 1:
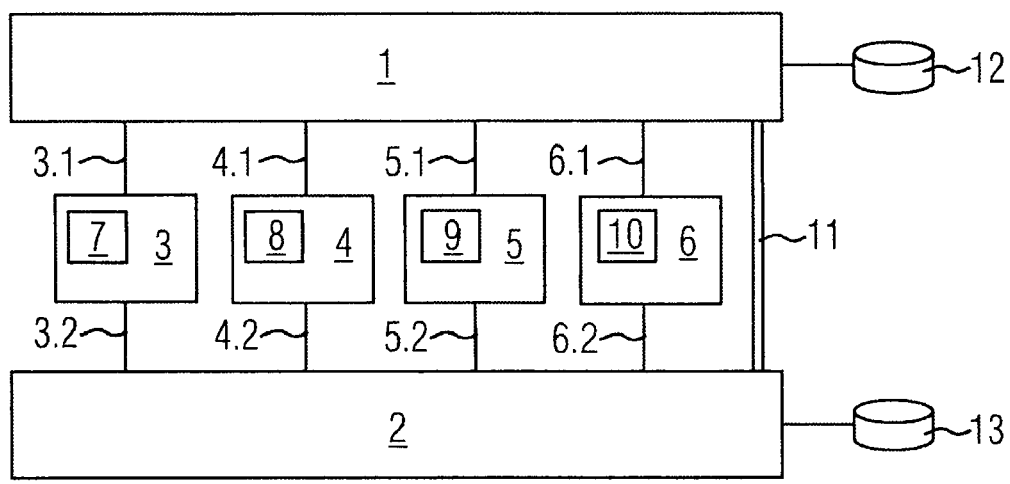
FIG. 1 redundant communication facilities which are correctly wired
FIG. 2 two switches of a redundant communication facility, where one node between the switches is incorrectly wired.

FIG. 1 shows a redundant communications facility which is correctly wired. Between the switches 1 and 2 are arranged four nodes, indicated by the reference marks 3 to 6, which are connected to the first and second switches 1 and 2 respectively via the links 3.1, 4.1, 5.1, 6.1 and 3.2, 4.2, 5.2, 6.2. Nodes 3 to 6 could, for example, be computers. On the nodes 3 to 6 or via these nodes 3 to 6, as applicable, run various applications 7 to 10. Furthermore, for security purposes the two switches 1 and 2 are directly connected to each other via a cross-link 11.

The communication facility is connected to the external network via the routers 12 and 13. With this configuration it is possible, by reconfiguration of the IP addresses, to rectify or bypass any individual fault, for example the failure of a link between the switches and of a node, the failure of an Ethernet port or the failure of an entire switch. For example, if one or more Ethernet interfaces on nodes 3 to 6 fail, then the communication can be continued via the duplicated cross-link 11.

This redundancy is missing if the Ethernet ports on a node are, due to incorrect wiring, both attached to the same switch 1 or both to switch 2. However, because of the redundant construction of the communication facility, this fault will only come to light if there is a failure of the switch concerned, 1 or 2. A wiring error of this type can occur relatively easily, and then degrades unnecessarily the full redundancy characteristics of the system. In FIG. 1 the topology of the highly-redundant configuration is correctly wired. With the assistance of IP address reconfiguration from one Ethernet port to the other, this configuration is resistant against all individual faults in the hardware. The (message) traffic always has one path to the outside.

Figure 2:
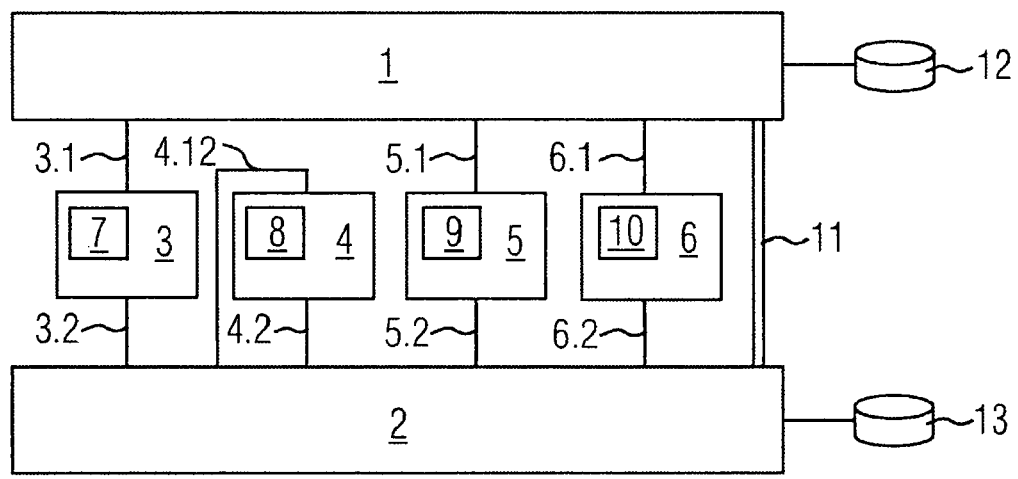

FIG. 2 shows the same redundant design of communication facility with two switches 1 and 2 as in FIG. 1, but unlike FIG. 1, the connection of the second node 4 to switch 1 is not correctly wired. The faulty wiring/incorrect link 4.12 has unintentionally been routed to the second switch 2.

The second node 4 is thus connected by both the links 4.2 and 4.12 to the second switch 2. This error is not apparent in normal operation, because the entire communication traffic runs via switch 2, and both routers 12 and 13 can be reached either via the direct path or the indirect path via cross-link 11. However, if the second switch 2 now fails, then the second node 4 is completely isolated because it has no physical possibility for sending traffic via switch 1 to the router. If switch 2 fails, nodes 3, 5 and 6 are still connected to the first router via the first switch 1.

With the help of the new method, this (wiring) fault 4.12 for the second node 4 can now easily be detected and then rectified. In a possible variant embodiment of the new method an application, here application 4, can interrogate the bridge tables (connection tables) on switches 1 and 2. It then recognizes that the network addresses of the second node 4 are not present at all on switch 1, and are present in duplicate on switch 2, and can report an alarm for this situation. The incorrect wiring/the faulty link 4.12 can then be rectified manually.

This is of course only a simple example, to demonstrate the principle. However, the topologies can become arbitrarily complex, for example in that one has cascaded switches and more than two interfaces/Internet ports per host, where of course the probability of an incorrect configuration then increases.

If a fault occurs, then the implications of the incorrect wiring are immediately incorporated into the decision about a standby circuit/alarm reporting, which increases the availability of the arrangement.

The topology is known at system startup, and can then be administered. When there are changes to the topology, the logical model is updated via an operating interface. Because false alarm reports would be sent during maintenance work, it should be possible to disable the alarm reporting or routine checks, as appropriate, via an operating interface.

It goes without saying that the characteristics of the invention, cited above, can be used not only in each specified combination but also in other combinations or singly, without going beyond the bounds of the invention.

The invention claimed is:

1. A method for error detection in a packet-based message distribution system, comprising:
 (a) distributing messages via a plurality of nodes and other system components,
 wherein each node includes at least two addressable interfaces,
 wherein message distribution paths are designed with redundancy for the security of the system, and
 wherein redundancy paths are available in the event of a failure of a link between nodes or a failure of a system component in the message distribution system;
 (b) providing a topology of the message distribution system to each of the nodes,
 wherein the topology includes a logical design of a topological structure of the message distribution system;
 (c) verifying by each node an accessibility of the other nodes via communication tests;
 (d) interrogating intermediate system components about their connection state with other nodes or system components via available interfaces; and
 (e) reporting a misconfiguration in the message distribution system in response to the interrogation indicating a misconfiguration; and
 (f) issuing an alarm report that reports the misconfiguration in the message distribution system to staff operating the message distribution system before a connection failure for a system component.

2. The method as claimed in the preceding claim 1, wherein the misconfiguration is a duplicate path.

3. The method as claimed in the preceding claim 1, wherein the message distribution system is an IP-based message distribution system, and wherein at least two unique network addresses are assigned to each node.

4. The method as claimed in the preceding claim 2, wherein the message distribution system a LAN or a VLAN, and wherein an address is an IP or MAC address.

5. The method as claimed in the preceding claim 1, wherein a change to data which specifies the topology is made via an operating interface.

6. The method as claimed in the preceding claim 1, wherein the misconfiguration of the message distribution system is corrected automatically.

7. The method as claimed in the preceding claim 6, wherein configuration data for the message distribution system is automatically modified without operator intervention in response to the misconfiguration.

8. The method as claimed in the preceding claim 1, wherein a connection state of the system components is stored in connection tables, and wherein each node checks the connection table of neighboring system components and reports when the network address of the respective node is not present, or the network address of the respective node is replicated.

9. The method as claimed in the preceding claim 1, wherein a connection state of the nodes is stored in connection tables, and wherein each node checks the connection table of neighboring system components and reports when the network address of the respective node is not present, or the network address of the respective node is replicated.

10. The method as claimed in the preceding claim 1, wherein the disabling and a correction of the misconfiguration are disabled.

11. The method as claimed in the preceding claim 10, wherein the reporting and the correction are disabled during maintenance work, restructuring or extension work activities.

12. The method as claimed in the preceding claim 1, wherein a node from the plurality of nodes or an intermediate system component is disconnected.

13. The method as claimed in the preceding claim 12, wherein the disconnection is for error detection, and verifying the circuit connections and configuration called for by the topology.

14. The method as claimed in the preceding claim 1, wherein an application that checks a bridge table of the neighboring system components and the network addresses present in the respective table is executed on each of the nodes.

15. The method as claimed in the preceding claim 1, wherein the communication tests for the nodes are disconnected during ongoing operation of the message distribution system.

16. The method as claimed in the preceding claim 15, wherein communications tests are reconnected as required.

17. The method as claimed in the preceding claim 14, wherein the application is disconnected during ongoing operation of the message distribution system.

18. The method as claimed in the preceding claim 17, wherein the application is reconnected as required.

19. The method as claimed in the preceding claim 1, wherein the communication tests occur during a system startup for the message distribution system or during the run-up of an additional system component.

20. The method as claimed in the preceding claim 1, wherein the communication tests occur routinely with the assistance of the system components upstream of control interfaces.

21. The method as claimed in the preceding claim 1, wherein the misconfiguration is a physical fault.

22. The method as claimed in the preceding claim 21, wherein the physical fault is a wiring fault.

23. The method as claimed in the preceding claim 21, wherein the physical fault relates to a node which is, according to the logical design of the topological structure of the message distribution system, incorrectly wired to intermediate system components.

24. The method as claimed in the preceding claim 1, wherein the misconfiguration is redundancy path that is missing due to incorrect wiring.

25. The method as claimed in the preceding claim 1, wherein the intermediate system components are intermediate network elements which serve to forward messages.

\* \* \* \* \*